(12) United States Patent
Burton et al.

(10) Patent No.: US 10,360,403 B2
(45) Date of Patent: Jul. 23, 2019

(54) COGNITIVE API POLICY MANAGER

(71) Applicant: INTERNATIONAL BUSINESS MACHINES CORPORATION, Armonk, NY (US)

(72) Inventors: Peter H. Burton, Vancouver (CA); Shahir A. Daya, North York (CA); Luc Desrosiers, Hampshire (GB); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/485,890

(22) Filed: Apr. 12, 2017

(65) Prior Publication Data

US 2018/0300498 A1    Oct. 18, 2018

(51) Int. Cl.
*G06F 21/62* (2013.01)
*H04L 29/06* (2006.01)

(52) U.S. Cl.
CPC ........ *G06F 21/6245* (2013.01); *H04L 63/102* (2013.01); *H04L 2463/102* (2013.01)

(58) Field of Classification Search
CPC .. G06F 21/6245; H04L 63/0281; H04L 63/20
USPC .......................................................... 726/26
See application file for complete search history.

(56) References Cited

U.S. PATENT DOCUMENTS

| | | | |
|---|---|---|---|
| 8,407,766 B1 | 3/2013 | Newstadt et al. | |
| 8,671,455 B1 | 3/2014 | Zhu et al. | |
| 9,129,129 B2 | 9/2015 | Raj et al. | |
| 9,177,174 B1 | 11/2015 | Shoemaker et al. | |
| 2006/0048224 A1 | 3/2006 | Duncan et al. | |
| 2012/0324225 A1 | 12/2012 | Chambers et al. | |

(Continued)

FOREIGN PATENT DOCUMENTS

| | | |
|---|---|---|
| WO | 2006025970 | 3/2006 |
| WO | 2014142742 | 9/2014 |

OTHER PUBLICATIONS

Shanshan, Meng et al.; Android's Sensitive Data Leakage Detection Based on API Monitoring; Proceedings of the 2013 Fifth International conference on Multimedia Information Networking and Security; Nov. 2013; pp. 907-910.

(Continued)

*Primary Examiner* — Evans Desrosiers
(74) *Attorney, Agent, or Firm* — Schmeiser, Olsen & Watts; Mark C. Vallone (57) ABSTRACT

An approach is provided for securing data. Concept expansion on a data structure and names of attributes of the data is performed. Values of fields of the data are matched to a pattern in a repository that includes patterns that specify concepts. Based on the concept expansions and the field values matched to the pattern, a concept of the data is identified and an inference score is determined. The inference score indicates whether the identified score requires a validation. If the inference score exceeds a threshold score, a policy associated with the concept is identified and an action to secure the data based on the policy is performed. If the inference score does not exceed the threshold score, (i) a validation of the concept is received or (ii) an indication that the identified concept is not valid and a new concept of the data are received.

16 Claims, 5 Drawing Sheets

(56) References Cited

U.S. PATENT DOCUMENTS

2013/0145467 A1    6/2013  Yodaiken
2015/0379429 A1*  12/2015  Lee .................. G06N 20/00
                                                  706/11

OTHER PUBLICATIONS

Johnson, Ethan J.; IRTG Miniproposal Assignment; CSC 400: Problem Seminar; Sep. 10, 2015; 6 pages.

* cited by examiner

COGNITIVE API POLICY MANAGER

BACKGROUND

The present invention relates to managing data at a system interface level, and more particularly to policy-based management of sensitive data.

Application programming interfaces (APIs) are driving innovation by unlocking data that used to reside in systems protected behind corporate firewalls. The new API economy is changing the way organizations build web applications and mobile applications. Combined with a push towards the Internet of Things (IoT), the world is experiencing a rapid expansion of API usage, where the APIs are increasingly richer and include both structured and unstructured data. The richness of these new APIs is making security control harder to implement and maintain. The drive toward rapid innovation also creates potential security breaches whereby sensitive data can be leaked unintentionally through unstructured data. Traditional security models are not well-adapted to detecting these types of breaches. The traditional security models rely on declarative or static control and the responsibility falls on the developers and administrators to properly define data security rules. Software delivery cycles are increasingly reduced, which leads to a risk that new releases of APIs introduce breaches through exposition of sensitive data, thereby transitioning the core benefit of APIs into a liability.

SUMMARY

In one embodiment, the present invention provides a method of securing data. The method includes a computer performing a concept expansion on a data structure of the data. The method further includes the computer performing a concept expansion on names of attributes of the data. The method further includes the computer matching values of fields of the data to a pattern included in a pattern repository that includes patterns that specify respective concepts. The method further includes based on the concept expansion of the data structure, the concept expansion on the names of the attributes, and the values of the fields of the data matched to the pattern, the computer identifying a concept of the data and determining an inference score indicating whether the identified concept requires a validation. The method further includes if the inference score exceeds a threshold score, the computer identifying a policy associated with the identified concept and performing an action to secure the data based on the identified policy, or if the inference score does not exceed the threshold score, the computer (i) receiving a validation of the identified concept or (ii) receiving an indication that the identified concept is not valid and receiving a new concept of the data.

In another embodiment, the present invention provides a computer program product including a computer readable storage medium having program instructions stored on the computer readable storage medium. The program instructions are executed by a central processing unit (CPU) of a computer system to cause the computer system to perform, by the CPU, a concept expansion on a data structure of the data. Further program instructions stored on the computer readable medium are executed by the CPU to cause the computer system to perform, by the CPU, a concept expansion on names of attributes of the data. Further program instructions stored on the computer readable medium are executed by the CPU to cause the computer system to match, by the CPU, values of fields of the data to a pattern included in a pattern repository that includes patterns that specify respective concepts. Further program instructions stored on the computer readable medium are executed by the CPU to cause the computer system to identify, by the CPU and based on the concept expansion of the data structure, the concept expansion on the names of the attributes, and the values of the fields of the data matched to the pattern, a concept of the data and determining an inference score indicating whether the identified concept requires a validation. Further program instructions stored on the computer readable medium are executed by the CPU to cause the computer system to if the inference score exceeds a threshold score, identify, by the CPU, a policy associated with the identified concept and perform, by the CPU, an action to secure the data based on the identified policy, or if the inference score does not exceed the threshold score, (i) receive, by the CPU, a validation of the identified concept or (ii) receive, by the CPU, an indication that the identified concept is not valid and receiving a new concept of the data.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of securing data. The method includes the computer system performing a concept expansion on a data structure of the data. The method further includes the computer system performing a concept expansion on names of attributes of the data. The method further includes the computer system matching values of fields of the data to a pattern included in a pattern repository that includes patterns that specify respective concepts. The method further includes based on the concept expansion of the data structure, the concept expansion on the names of the attributes, and the values of the fields of the data matched to the pattern, the computer system identifying a concept of the data and determining an inference score indicating whether the identified concept requires a validation. The method further includes if the inference score exceeds a threshold score, the computer system identifying a policy associated with the identified concept and performing an action to secure the data based on the identified policy, or if the inference score does not exceed the threshold score, the computer system (i) receiving a validation of the identified concept or (ii) receiving an indication that the identified concept is not valid and receiving a new concept of the data.

Embodiments of the present invention provide a security system with an understanding of the semantics of information being carried in unstructured data and dynamically determine what data is being leaked through structured or unstructured data, which avoids or decreases undetected regulatory rule violations, user agreement breaches, and intellectual capital leaks.

DETAILED DESCRIPTION

Overview

Embodiments of the present invention secure data at a system interface level by understanding semantics of information carried in the data, and discovering, monitoring, and detecting breaches of data security policies. Embodiments of the present invention apply cognitive capabilities to increase the accuracy of automated interventions of the data while significantly reducing human interventions.

In one or more embodiments of the present invention, policies are automatically determined and applied to APIs so that sensitive data is automatically identified and categorized based on the semantics of the API interface. Using a combination of cognitive computing and statistical modeling, embodiments of the present invention inspect the API, including its operation name, attribute name, and value (i.e., structured or unstructured).

Through an application of natural language recognition, concept expansion, and cognitive computing, embodiments disclosed herein derive a network of canonical expressions that are matched against known patterns. Statistical models may be used to determine the level of certainty of a match to a known pattern in order to request confirmation from a system administrator in response to a minimum threshold not being met. For each confirmed match, embodiments of the present invention learn from and track services dynamically as they evolve over time.

In one embodiment, an API Inspector translates an API payload into inferred concepts by using cognitive computing techniques such as concept expansion and pattern matching. A validation workflow determines whether the inferred concepts require a validation and whether a validation by a human is required. Subsequent to the validation, the system disclosed herein learns from the outcome of the validation and adjusts an inference score accordingly for subsequent inspections of API payloads. A policy manager validates the concept against known policy sets to determine if any action is required to secure the data in the payload. In one embodiment, a cognitive API policy manager implements the functionality of the aforementioned API Inspector, validation workflow, and policy manager.

Known systems face a unique challenge to secure data because the systems are using an inflexible declarative control which is not adaptable to the quick development of APIs. Furthermore, known systems are not able to understand the semantics of information being carried in the data which may lead to undetected violations of regulatory rules (e.g., Payment Card Industry Data Security Standards, Export Administration Regulations, International Traffic in Arms regulations, etc.), breaches of user agreements, or leaks of intellectual capital. The aforementioned challenges faced by existing security systems may be overcome by the functionality of the cognitive API policy manager and other embodiments, as discussed herein.

System for Securing Data

Figure 1:
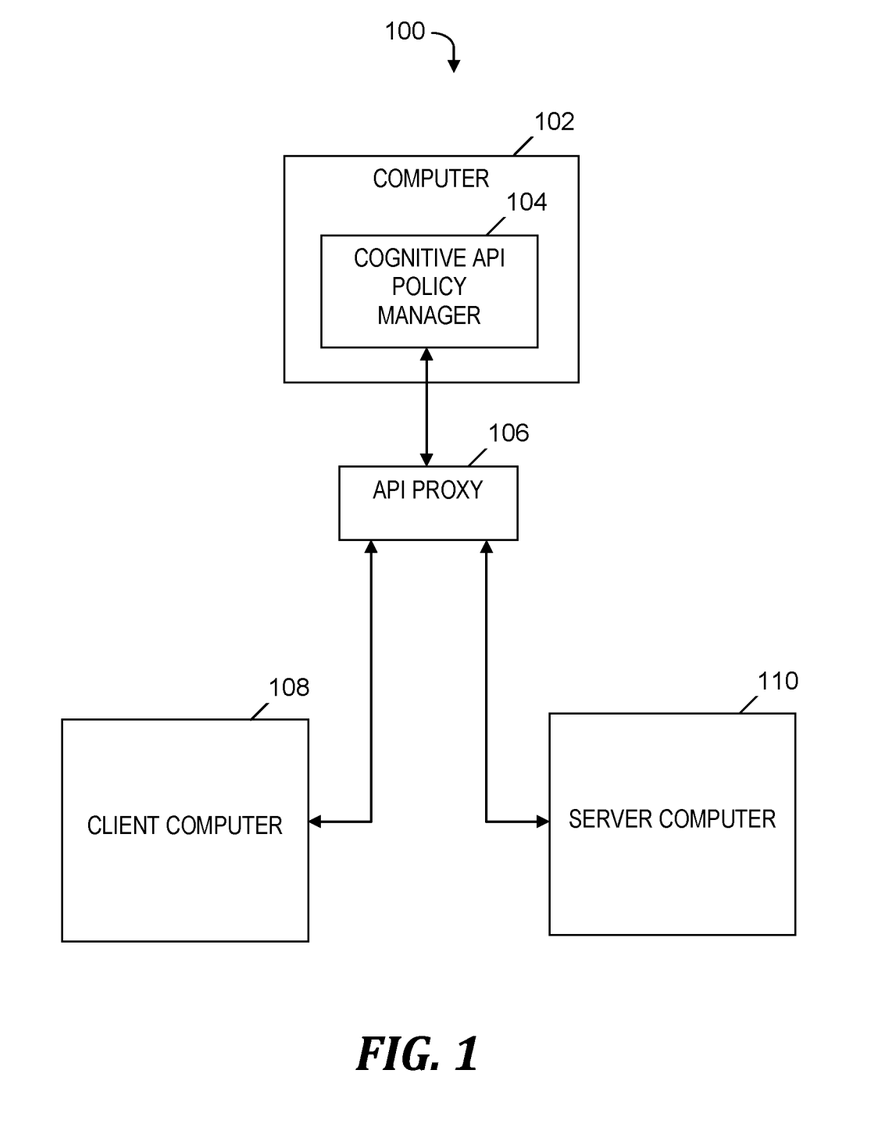
FIG. 1 is a block diagram of a system for securing data, in accordance with embodiments of the present invention.

FIG. 1 is a block diagram of a system 100 for securing data, in accordance with embodiments of the present invention. System 100 includes a computer 102, which executes a software-based cognitive API policy manager (CAPM) 104. System 100 also includes a software-based API proxy 106, which is executed by another computer (not shown) which is coupled to computer 102 via a computer network (not shown). Alternatively, API proxy 106 is executed by computer 102. System 100 also includes a client computer 108 and a server computer 110 which provides one or more APIs (not shown).

Figure 2A:
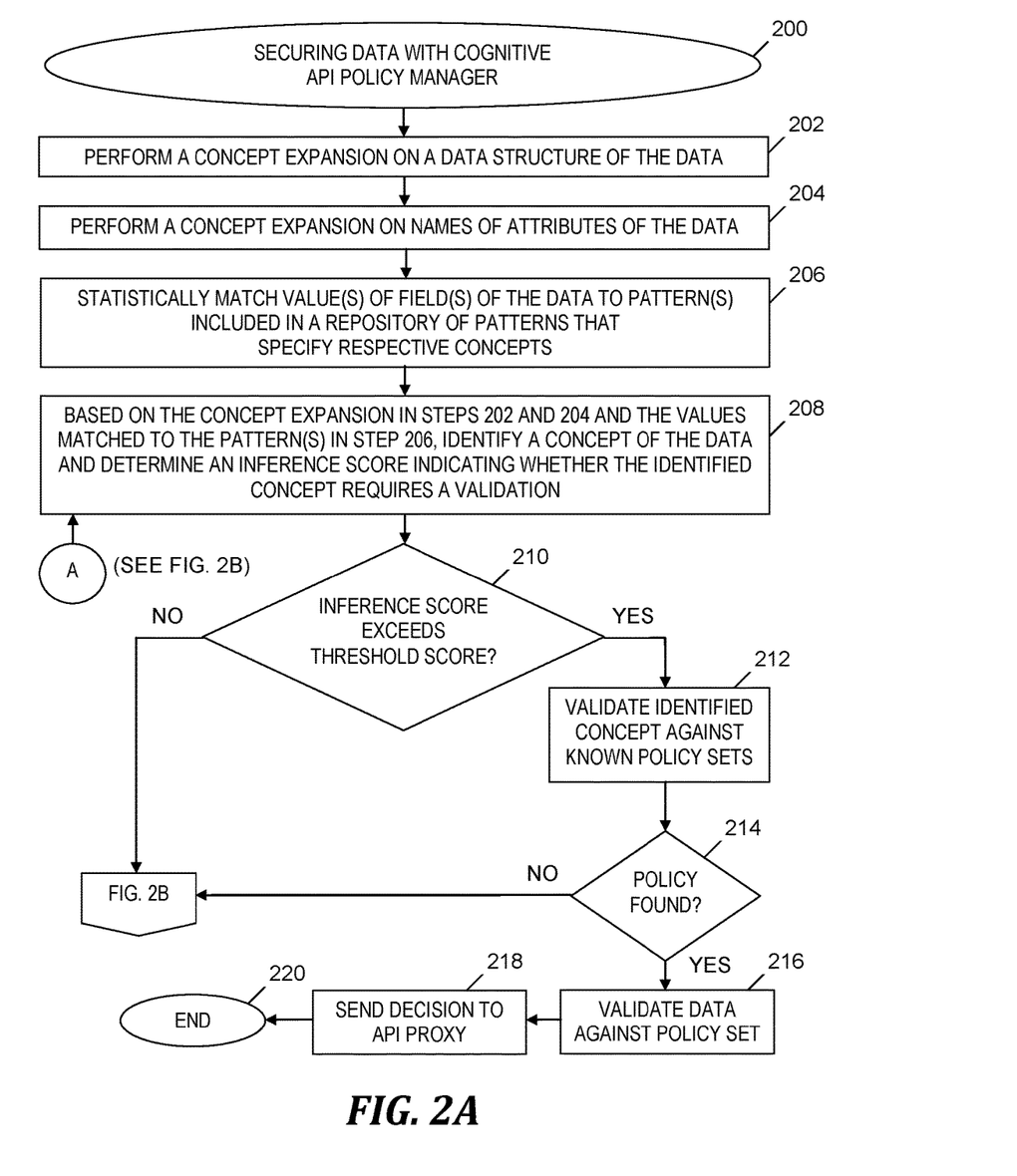
FIGS. 2A-2B depict a flowchart of a process of securing data, in accordance with embodiments of the present invention.
Figure 2B:
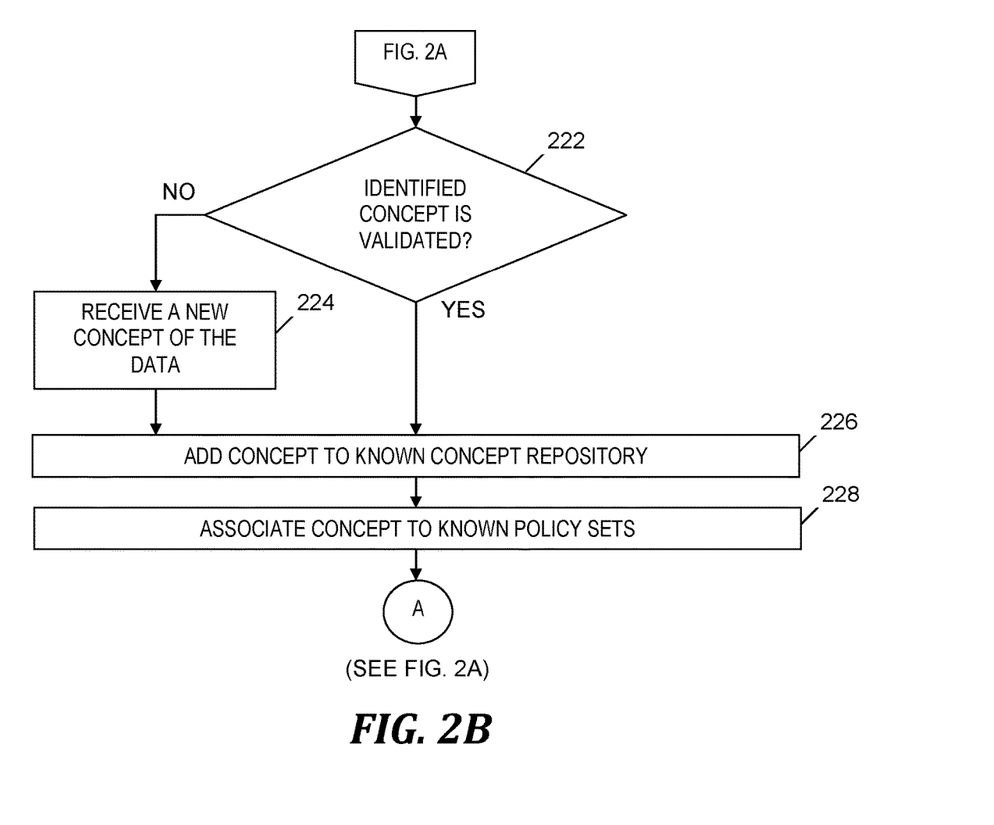

In one embodiment, client computer 108 invokes an API in a client request. API proxy 106 intercepts the client request and forwards the client request, which includes an API payload, to CAPM 104 for inspection. Depending on the results of the validations and API payload processing described below relative to the process of FIGS. 2A-2B are completed, CAPM 104 may generate and send a command to API proxy 106 to handle the client request. API proxy 106 forwards the client request to server computer 110 for processing. Server computer 110 processes the client request and returns a reply. API proxy 106 intercepts the reply and forwards the reply, which includes an API payload, to CAPM 104 for inspection. Depending on the results of the validations and API payload processing described below relative to the process of FIGS. 2A-2B, CAPM 104 may generate and send a command to API proxy 106 to handle the reply. API proxy 106 sends the reply to client computer 108.

In one embodiment, CAPM 104 is implemented as a software program, operated by an administrator role, such as a security analyst. In one embodiment, CAPM 104 is deployed in a cloud-based environment. In another embodiment, CAPM 104 is deployed directly within a computer server environment.

In one embodiment, CAPM 104 attempts to match the API payload to known concepts to determine whether policies are being satisfied. CAPM 104 may inspect both the request payload and the reply payload to prevent inadvertent disclosure from either client computer 108 or server computer 110.

Figure 3:
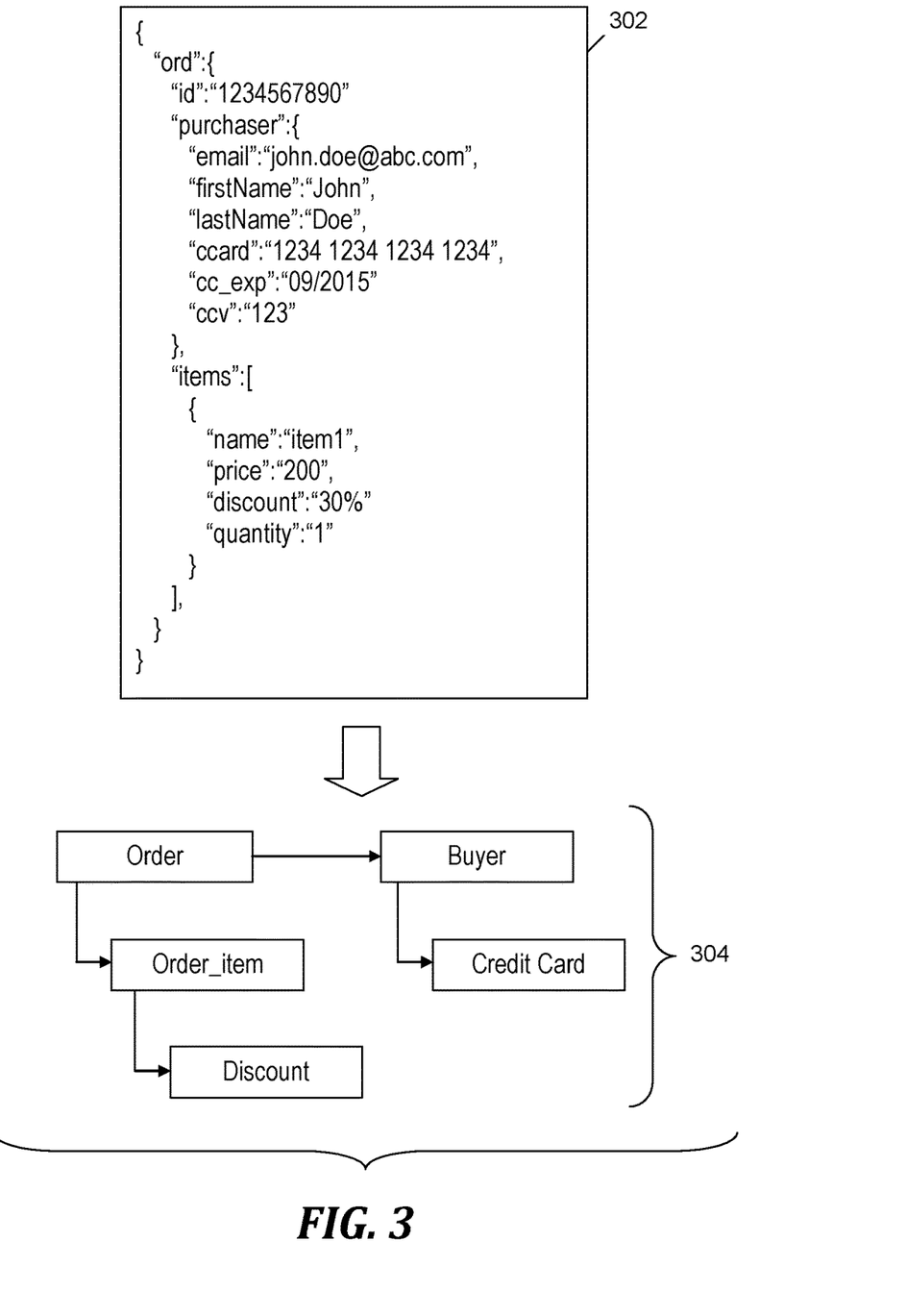
FIG. 3 is an example an API payload being converted to a concept map in the process of FIG. 2, in accordance with embodiments of the present invention.

The functionality of the components shown in FIG. 1 is described in more detail in the discussion of FIGS. 2A-2B and FIG. 3 presented below.

Process for Securing Data

FIGS. 2A-2B depict a flowchart of a process of securing data, in accordance with embodiments of the present invention. The process of FIGS. 2A-2B begins at step 200 in FIG. 2A. In step 202, CAPM 104 (see FIG. 1) performs a concept expansion on a data structure of the data being secured. In one embodiment, the data being secured is data in an API call, which may be a request sent by client computer 108 or a reply sent by server computer 110. Hereinafter, in the discussion of FIGS. 2A-2B, the data being secured is also referred to simply as "the data." As used herein, a concept is defined as a class of objects and terms in a domain. The concept expansion on the data structure includes determining a context of the data structure by matching elements of the data structure with respective concepts.

In step 204, CAPM 104 (see FIG. 1) performs a concept expansion on names of attributes of the data. The concept expansion on the names of the attributes of the data includes determining a context of the names of the attributes by matching the names with respective concepts.

In step 206, CAPM 104 (see FIG. 1) statistically matches value(s) included in field(s) of the data to pattern(s) included in a repository of patterns that specify respective concepts. In one embodiment, CAPM 104 (see FIG. 1) utilizes the results of steps 202, 204, and 206 to convert the API payload into a concept map.

For example, the concept expansions in steps 202 and 204 may indicate that the data structure of the data and the names of the attributes of the data match concepts related to a credit card transaction, which is represented by a concept map. Because the values of a field of the data in step 206 match a credit card format which is included in the repository of patterns, CAPM 104 (see FIG. 1) confirms the concepts related to a credit card transaction, which were indicated by steps 202 and 204.

In step 208, based on the concept expansion in steps 202 and 204 and based on the value(s) matched to the pattern(s) in step 206, CAPM 104 (see FIG. 1) identifies a concept of the data and determines an inference score which indicates whether the identified concept requires a validation by a human administrator. In one embodiment, step 208 includes CAPM 104 (see FIG. 1) inferring the concept of the data based on a canonical model (i.e., by utilizing a pre-existing graph of concepts or concept map which is based on industry lexicons, to identify a match with an inference score).

In step 210, CAPM 104 (see FIG. 1) determines whether the inference score exceeds a predetermined threshold score. CAPM 104 (see FIG. 1) receives or determines the threshold score prior to step 210.

If CAPM 104 (see FIG. 1) determines in step 210 that the inference score exceeds the threshold score, then the Yes branch of step 210 is followed and step 212 is performed.

In step 212, CAPM 104 (see FIG. 1) validates the concept identified in step 208 against known policy sets.

In step 214, CAPM 104 (see FIG. 1) determines whether a policy was found to validate the concept in step 212. If CAPM 104 (see FIG. 1) determines in step 214 that a policy set was found to validate the concept, then the Yes branch of step 214 is followed and step 216 is performed.

In step 216, CAPM 104 (see FIG. 1) validates the data against the policy set by performing a known security check aligned to the policy set. The validation is performed on the actual attribute values and CAPM 104 (see FIG. 1) either (i) performs an action which affects the access to the API (and skips step 218) or (ii) renders a decision that determines the action and in step 218 sends the decision to API proxy 106 (see FIG. 1) to instruct API proxy 106 (see FIG. 1) to perform the aforementioned action. The action may include blocking the request or reply so that the request or reply is not processed, masking sensitive data included in the data, or removing sensitive data included in the data.

In one embodiment, step 218 is performed in cases in which the application of the policy is synchronous, so that CAPM 104 (see FIG. 1) returns the decision about the action to API proxy 106 (see FIG. 1) for application of the policy before the completion of the transaction that includes the API call.

Following step 218, the process of FIGS. 2A-2B ends at step 220.

Returning to step 214, if CAPM 104 (see FIG. 1) determines that a policy set was not found to validate the concept identified in step 208, then the No branch of step 214 is followed and the process continues with step 222 in FIG. 2B, as discussed below.

Returning to step 210, if CAPM 104 (see FIG. 1) determines that the inference score does not exceed the threshold score, then the No branch of step 210 is followed and the process continues with step 222 in FIG. 2B.

Following the No branch of step 214 and before step 222 in FIG. 2B, or following the No branch of step 210 and before step 222 in FIG. 2B, a human administrator determines whether the concept identified in step 208 is validated and CAPM 104 (see FIG. 1) receives the human administrator's determination about whether the concept is validated. In step 222 in FIG. 2B, CAPM 104 (see FIG. 1) determines whether the concept identified in step 208 (see FIG. 2A) is validated based on the determination of the human administrator. If CAPM 104 (see FIG. 1) determines in step 222 that the identified concept is not validated based on the determination of the human administrator, then the No branch of step 222 is followed and step 224 is performed.

In step 224, CAPM 104 (see FIG. 1) receives a new concept of the data, where the new concept is generated by the human administrator or another human, where the API call relates to the new concept. Alternatively, the human administrator selects another concept from a repository of known concepts as the concept that is appropriately related to the API call. Step 226 follows step 224.

Returning to step 222, if CAPM 104 (see FIG. 1) determines that the identified concept is validated based on the determination of the human administrator, then the Yes branch of step 222 is followed and step 226 is performed. In a case in which the human administrator indicates that the concept is validated but the inference score does not exceed the threshold score, CAPM 104 (see FIG. 1) determines a new inference score by increasing the previous inference score of the concept or receiving an increased inference score, where the new inference score of the concept exceeds the threshold score.

In step 226, if the No branch of step 222 was taken, CAPM 104 (see FIG. 1) adds the new concept received in step 224 to the repository of known concepts. If the Yes branch of step 222 was taken, then in step 226, CAPM 104 (see FIG. 1) adds the concept to the repository of known concepts, where the concept was determined to be a validated concept in step 222.

In step 228, CAPM 104 (see FIG. 1) associates the concept to the known policy sets, where the concept was added to the repository of known concepts in step 226. The association of the concept to the known policy sets dictates what information and rules that CAPM 104 (see FIG. 1) applies to determine actions that system 100 takes to secure the data. Following step 228, the process of FIGS. 2A-2B loops back to step 208 in FIG. 2A.

In one embodiment, CAPM 104 (see FIG. 1) may switch the inspection of the API in steps 202, 204, 206, and 208 in FIG. 2A from a synchronous mode to an asynchronous mode. Inspection in asynchronous mode is useful in circumstances in which CAPM 104 (see FIG. 1) determines that the risk of a security breach is minimal and trending data indicates no policy violations. In asynchronous mode, CAPM 104 (see FIG. 1) does not block or alter the request or the reply, but notifies required user groups of a policy breach upon detection of the breach. Using asynchronous mode increases throughput by avoiding the synchronous mode's processing burden of intervening at every request and reply and completing the analysis by CAPM 104 (see FIG. 1) before completing the corresponding processing of the request or reply.

Examples

FIG. 3 is an example an API payload being converted to a concept map in the process of FIG. 2, in accordance with embodiments of the present invention. After CAPM 104 (see FIG. 1) inspects an API payload 302 by performing steps 202, 204, and 206 in FIG. 2A, CAPM 104 (see FIG. 1) converts API payload 302 into a concept map 304. For example, in step 202 (see FIG. 2A), CAPM 104 (see FIG. 1) converts ord and items in API payload 302 to Order and Order_item, respectively, in concept map 304. In step 204 (see FIG. 2A), CAPM 104 (see FIG. 1) regroups attribute names ccard, cc_exp, and ccv in API payload 302 under the concept Credit Card in concept map 304. In step 206 (see FIG. 2A), CAPM 104 (see FIG. 1) statistically matches the field value "1234 1234 1234 1234" of ccard in API payload 302 to a credit card format stored in a pattern repository, thereby confirming the concepts determined in steps 202 and 204 (see FIG. 2A).

In step 208 (see FIG. 2A), by using a pre-existing graph of concepts based on industry lexicons, CAPM 104 (see FIG. 1) identifies a match to concept map 304 and determines an inference score of the match to concept map 304.

Computer System

Figure 4:
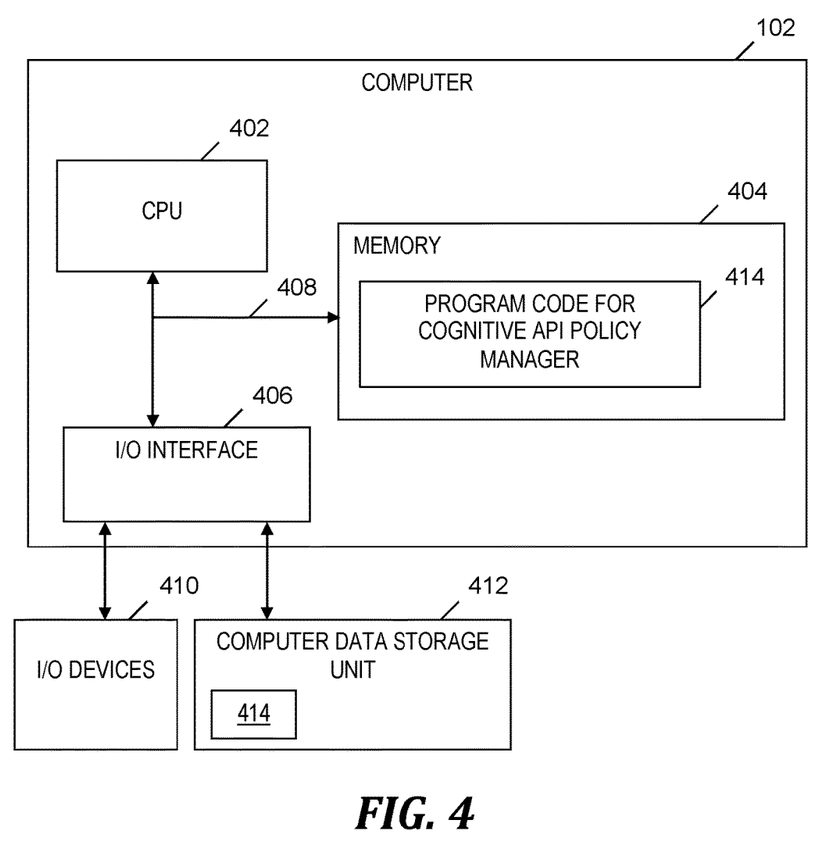
FIG. 4 is a block diagram of a computer included in the system of FIG. 1 and that implements the process of FIGS. 2A-2B, in accordance with embodiments of the present invention.

FIG. 4 is a block diagram of a computer included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for cognitive API policy manager 104 (see FIG. 1) to perform a method of securing data, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to secure data. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may store concepts, policy sets, and patterns to which field values are matched.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to securing data. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to secure data. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of securing data.

While it is understood that program code 414 for securing data may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of securing data. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of securing data, the method comprising the steps of:

a computer determining a context of a data structure of data by matching elements of the data structure with respective classes of objects and terms in a domain, the data being included in a first call to an application programming interface (API) which is a first request sent by a client computer system or a first reply sent by a server computer system;

the computer determining a context of names of attributes of the data by matching the names of the attributes with the respective classes of the objects and the terms in the domain;

based on the context of the data structure of the data and the context of the names of the attributes of the data, the computer making an initial determination that the data structure of the data and the names of the attributes of the data match a concept associated with the domain;

the computer matching values of fields of the data to a pattern included in a pattern repository that includes patterns that specify respective concepts;

the computer determining that the pattern matched to the values of the fields of the data specifies the concept that matches the data structure of the data and the names of the attributes of the data;

based on the pattern matched to the values of the fields of the data specifying the concept that matches the data structure of the data and the names of the attributes of the data, the computer confirming the initial determination that the data structure of the data and the names of the attributes of the data match the concept associated with the domain;

based on the confirmation of the initial determination that the data structure of the data and the names of the attributes of the data match the concept associated with the domain, the computer identifying the concept associated with the domain as a concept of the data and determining a first inference score indicating whether the identified concept requires a validation by a human administrator;

the computer determining that the first inference score does not exceed a threshold score and in response to the step of determining that the first inference score does not exceed the threshold score, the computer receiving a determination by the human administrator that the identified concept is validated;

in response to the step of receiving the determination by the human administrator that the identified concept is validated, the computer increasing the first inference score to a second inference score so that the second inference score exceeds the threshold score and indicates that the identified concept does not require the validation by the human administrator;

the computer adding the identified concept to a repository of known concepts;

the computer associating the identified concept to a set of known policies;

subsequent to the step of associating the identified concept to the set of known policies:

the computer determining contexts of the data structure and names of the attributes of the data included in a second call to the API which is a second request sent by the client computer system or a second reply sent by the server computer system;

the computer determining that the data structure and the names of the attributes of the data in the second call match a second concept associated with the domain;

the computer matching second values of fields of the data in the second call to the pattern;

the computer determining that the pattern matched to the second values of the fields specifies the second concept that matches the data structure and the names of the attributes of the data in the second call;

based on the pattern matched to the second values, the computer confirming the determination that the data structure and the names of the attributes of the data in the second call match the second concept associated with the domain;

based on the confirmation of the determination that the data structure and the names of the attributes of the data in the second call match the second concept associated with the domain, the computer identifying the second concept associated with the domain as the previously identified concept associated with the first call and determining the second inference score rather than the first inference score as an inference score indicating whether the identified second concept requires the validation by the human administrator;

the computer determining that the second inference score exceeds the threshold score and in response to the step of determining that the second inference score exceeds the threshold score, the computer determining whether the identified second concept is associated with any set in sets of known policies;

the computer determining that the identified second concept is associated with the set of known policies based on the second concept being identified as the previously identified concept associated with the first call;

based on the second inference score exceeding the threshold score and the identified second concept being associated with the set of known policies, the computer blocking the second request or the second reply so that the second request or the second reply is not processed, the blocking of the second request or the second reply securing the data in accordance with the set of known policies, the blocking being performed before a completion of a transaction that includes the second call, and the blocking being performed without requiring the validation of the identified second concept by the human administrator, which increases an accuracy of automated intervention to secure the data and decreases human intervention to secure the data.

2. The method of claim 1, wherein the step of identifying the concept includes determining a match between the identified concept and a predetermined graph of concepts based on lexicons.

3. The method of claim 1, further comprising the steps of based on a third inference score for a third concept of the data not exceeding the threshold score, a determination by the human administrator that the third concept is not valid, and a receipt of a new concept of the data, the computer adding the new concept to a repository of known concepts and identifying another policy as being associated with the new concept.

4. The method of claim 3, further comprising the steps of:
in response to the steps of adding the new concept to the repository of known concepts and identifying the other policy as being associated with the new concept, the computer determining a match between the new concept and a predetermined graph of concepts which are based on lexicons and determining another inference score indicating whether the new concept requires a validation;
the computer determining that the other inference score exceeds the threshold score; and
based on the other inference score exceeding the threshold score, the computer validating the other policy associated with the new concept and performing an action to secure the data based on the other policy.

5. The method of claim 1, further comprising the step of:
the computer applying a cognitive computing technique on a payload of the second call to the API, wherein the step of applying the cognitive computing technique includes the steps of determining the contexts of the data structure and the names of the attributes of the data included in the second call and matching the second values of the fields of the data in the second call to the pattern included in the pattern repository, and wherein the step of identifying the second concept is based on the step of applying the cognitive computing technique.

6. The method of claim 1, further comprising the step of:
the computer receiving the second request or the second reply from an API proxy after the API proxy intercepts the second request being sent from the client computer system or the second reply being sent from the server computer system.

7. The method of claim 1, further comprising the step of:
providing at least one support service for at least one of creating, integrating, hosting, maintaining, and deploying computer readable program code in the computer, the program code being executed by a processor of the computer to implement the steps of determining the context of the data structure of the data, determining the context of the names of the attributes of the data, making the initial determination that the data structure and the names of the attributes of the data match the concept associated with the domain, matching the values of the fields of the data to the pattern included in the pattern repository, determining that the pattern specifies the concept, confirming the initial determination that the data structure and the names of the attributes match the concept, identifying the concept associated with the domain as the concept of the data, determining the first inference score, determining that the first inference score does not exceed the threshold score, receiving the determination by the human administrator that the identified concept is validated, increasing the first inference score to the second inference score, adding the identified concept to the repository of known concepts, associating the identified concept to the set of known policies, determining the contexts of the data structure and the names of the attributes of the data included in the second call, determining that the data structure and the names of the attributes of the data in the second call match the second concept associated with the domain, matching the second values of fields of the data in the second call to the pattern, determining that the pattern matched to the second values specifies the second concept, confirming the determination that the data structure and the names of the attributes of the data in the second call match the second concept associated with the domain, identifying the second concept associated with the domain as the previously identified concept, determining the second inference score as the inference score indicating whether the identified second concept requires the validation by the human administrator, determining that the second inference score exceeds the threshold score, determining whether the identified second concept is associated with any set in the sets of known policies, determining that the identified second concept is associated with the set of known policies, and blocking the second request or the second reply.

8. A computer program product for securing data, the computer program product comprising a computer readable storage medium having program instructions stored thereon, the program instructions are executed by a central processing unit (CPU) of a computer system to cause the computer system to:
determine, by the CPU, a context of a data structure of data by matching elements of the data structure with respective classes of objects and terms in a domain, the data being included in a first call to an application programming interface (API) which is a first request sent by a client computer system or a first reply sent by a server computer system;
determine, by the CPU, a context of names of attributes of the data by matching the names of the attributes with the respective classes of the objects and the terms in the domain;
make, by the CPU and based on the context of the data structure of the data and the context of the names of the attributes of the data, an initial determination that the data structure of the data and the names of the attributes of the data match a concept associated with the domain;
match, by the CPU, values of fields of the data to a pattern included in a pattern repository that includes patterns that specify respective concepts;
determine, by the CPU, that the pattern matched to the values of the fields of the data specifies the concept that matches the data structure of the data and the names of the attributes of the data;
confirm, by the CPU and based on the pattern matched to the values of the fields of the data specifying the concept that matches the data structure of the data and the names of the attributes of the data, the initial determination that the data structure of the data and the names of the attributes of the data match the concept associated with the domain;
identify, by the CPU and based on the confirmation of the initial determination that the data structure of the data and the names of the attributes of the data match the concept associated with the domain, the concept associated with the domain as a concept of the data and determine, by the CPU and based on the confirmation of the initial determination that the data structure of the data and the names of the attributes of the data match the concept associated with the domain, a first inference score indicating whether the identified concept requires a validation by a human administrator;
determine, by the CPU, that the first inference score does not exceed a threshold score and in response to determining that the first inference score does not exceed the threshold score, receive, by the CPU, a determination by the human administrator that the identified concept is validated;

increase, by the CPU and in response to receiving the determination by the human administrator that the identified concept is validated, the first inference score to a second inference score so that the second inference score exceeds the threshold score and indicates that the identified concept does not require the validation by the human administrator;

add, by the CPU, the identified concept to a repository of known concepts;

associate, by the CPU, the identified concept to a set of known policies;

subsequent to associating the identified concept to the set of known policies:
  determine, by the CPU, contexts of the data structure and names of the attributes of the data included in a second call to the API which is a second request sent by the client computer system or a second reply sent by the server computer system;
  determine, by the CPU, that the data structure and the names of the attributes of the data in the second call match a second concept associated with the domain;
  match, by the CPU, second values of fields of the data in the second call to the pattern;
  determine, by the CPU, that the pattern matched to the second values of the fields specifies the second concept that matches the data structure and the names of the attributes of the data in the second call;
  confirm, by the CPU and based on the pattern matched to the second values, the determination that the data structure and the names of the attributes of the data in the second call match the second concept associated with the domain;
  identify, by the CPU and based on the confirmation of the determination that the data structure and the names of the attributes of the data in the second call match the second concept associated with the domain, the second concept associated with the domain as the previously identified concept associated with the first call and determine, by the CPU and based on the confirmation of the determination that the data structure and the names of the attributes of the data in the second call match the second concept associated with the domain, the second inference score rather than the first inference score as an inference score indicating whether the identified second concept requires the validation by the human administrator;
  determine, by the CPU, that the second inference score exceeds the threshold score and in response to the step of determining that the second inference score exceeds the threshold score, determine, by the CPU, whether the identified second concept is associated with any set in sets of known policies;
  determine, by the CPU, that the identified second concept is associated with the set of known policies based on the second concept being identified as the previously identified concept associated with the first call;
  block, by the CPU and based on the second inference score exceeding the threshold score and the identified second concept being associated with the set of known policies, the second request or the second reply so that the second request or the second reply is not processed, the blocking of the second request or the second reply securing the data in accordance with the set of known policies, the blocking being performed before a completion of a transaction that includes the second call, and the blocking being performed without requiring the validation of the identified second concept by the human administrator, which increases an accuracy of automated intervention to secure the data and decreases human intervention to secure the data.

9. The computer program product of claim 8, wherein the program instructions executed by the CPU to identify, by the CPU, the concept include program instructions that are executed by the CPU to determine, by the CPU, a match between the identified concept and a predetermined graph of concepts based on lexicons.

10. The computer program product of claim 8, further comprising the computer readable storage medium having further program instructions stored thereon, the further program instructions are executed by the CPU to cause the CPU to add, based on a third inference score for a third concept of the data not exceeding the threshold score, a determination by the human administrator that the third concept is not valid, and a receipt of a new concept of the data, the new concept to a repository of known concepts and identify another policy as being associated with the new concept.

11. The computer program product of claim 10, further comprising the computer readable storage medium having further program instructions stored thereon, the further program instructions are executed by the CPU to cause the CPU to:
  determine, by the CPU, and in response to the steps of adding the new concept to the repository of known concepts and identifying the other policy as being associated with the new concept, a match between the new concept and a predetermined graph of concepts which are based on lexicons and determine, by the CPU, another inference score indicating whether the new concept requires a validation;
  determine, by the CPU, that the other inference score exceeds the threshold score; and
  validate, by the CPU, and based on the other inference score exceeding the threshold score, the other policy associated with the new concept and perform, by the CPU, an action to secure the data based on the other policy.

12. The computer program product of claim 8, further comprising the computer readable storage medium having further program instructions stored thereon, the further program instructions are executed by the CPU to cause the CPU to:
  apply, by the CPU, a cognitive computing technique on a payload of the second call to the API, wherein applying the cognitive computing technique includes performing the concept expansion on the data structure of the data, performing the concept expansion on the names of the attributes of the data, and matching the values of the fields of the data to the pattern included in the pattern repository, and wherein identifying the concept of the data is based on applying the cognitive computing technique.

13. A computer system comprising:
  a central processing unit (CPU);
  a memory coupled to the CPU; and
  a computer readable storage medium coupled to the CPU, the computer readable storage medium containing instructions that are executed by the CPU via the memory to implement a method of securing data, the method comprising the steps of:

the computer system determining a context of a data structure of data by matching elements of the data structure with respective classes of objects and terms in a domain, the data being included in a first call to an application programming interface (API) which is a first request sent by a client computer system or a first reply sent by a server computer system;

the computer system determining a context of names of attributes of the data by matching the names of the attributes with the respective classes of the objects and the terms in the domain;

based on the context of the data structure of the data and the context of the names of the attributes of the data, the computer system making an initial determination that the data structure of the data and the names of the attributes of the data match a concept associated with the domain;

the computer system matching values of fields of the data to a pattern included in a pattern repository that includes patterns that specify respective concepts;

the computer system determining that the pattern matched to the values of the fields of the data specifies the concept that matches the data structure of the data and the names of the attributes of the data;

based on the pattern matched to the values of the fields of the data specifying the concept that matches the data structure of the data and the names of the attributes of the data, the computer system confirming the initial determination that the data structure of the data and the names of the attributes of the data match the concept associated with the domain;

based on the confirmation of the initial determination that the data structure of the data and the names of the attributes of the data match the concept associated with the domain, the computer system identifying the concept associated with the domain as a concept of the data and determining a first inference score indicating whether the identified concept requires a validation by a human administrator;

the computer system determining that the first inference score does not exceed a threshold score and in response to the step of determining that the first inference score does not exceed the threshold score, the computer system receiving a determination by the human administrator that the identified concept is validated;

in response to the step of receiving the determination by the human administrator that the identified concept is validated, the computer system increasing the first inference score to a second inference score so that the second inference score exceeds the threshold score and indicates that the identified concept does not require the validation by the human administrator;

the computer system adding the identified concept to a repository of known concepts;

the computer system associating the identified concept to a set of known policies;

subsequent to the step of associating the identified concept to the set of known policies:

the computer system determining contexts of the data structure and names of the attributes of the data included in a second call to the API which is a second request sent by the client computer system or a second reply sent by the server computer system;

the computer system determining that the data structure and the names of the attributes of the data in the second call match a second concept associated with the domain;

the computer system matching second values of fields of the data in the second call to the pattern;

the computer system determining that the pattern matched to the second values of the fields specifies the second concept that matches the data structure and the names of the attributes of the data in the second call;

based on the pattern matched to the second values, the computer system confirming the determination that the data structure and the names of the attributes of the data in the second call match the second concept associated with the domain;

based on the confirmation of the determination that the data structure and the names of the attributes of the data in the second call match the second concept associated with the domain, the computer system identifying the second concept associated with the domain as the previously identified concept associated with the first call and determining the second inference score rather than the first inference score as an inference score indicating whether the identified second concept requires the validation by the human administrator;

the computer system determining that the second inference score exceeds the threshold score and in response to the step of determining that the second inference score exceeds the threshold score, the computer system determining whether the identified second concept is associated with any set in sets of known policies;

the computer system determining that the identified second concept is associated with the set of known policies based on the second concept being identified as the previously identified concept associated with the first call;

based on the second inference score exceeding the threshold score and the identified second concept being associated with the set of known policies, the computer system blocking the second request or the second reply so that the second request or the second reply is not processed, the blocking of the second request or the second reply securing the data in accordance with the set of known policies, the blocking being performed before a completion of a transaction that includes the second call, and the blocking being performed without requiring the validation of the identified second concept by the human administrator, which increases an accuracy of automated intervention to secure the data and decreases human intervention to secure the data.

14. The computer system of claim 13, wherein the step of identifying the concept includes determining a match between the identified concept and a predetermined graph of concepts based on lexicons.

15. The computer system of claim 13, wherein the method further comprises the steps of based on a third inference score for a third concept of the data not exceeding the threshold score, a determination by the human administrator that the third concept is not valid, and a receipt of a new concept of the data, the computer system adding the new concept to a repository of known concepts and identifying another policy as being associated with the new concept.

16. The computer system of claim 15, wherein the method further comprises the steps of:

in response to the steps of adding the new concept to the repository of known concepts and identifying the other policy as being associated with the new concept, the computer system determining a match between the new concept and a predetermined graph of concepts which are based on lexicons and determining another inference score indicating whether the new concept requires a validation;

the computer system determining that the second inference score exceeds the threshold score; and based on the other inference score exceeding the threshold score, the computer system validating the other policy associated with the new concept and performing an action to secure the data based on the other policy.

\* \* \* \* \*